Aug. 7, 1923.

L. B. HORTON

TRACTOR OR THE LIKE

Filed July 22, 1919

INVENTOR.
Lyman B. Horton
By Parker & Prochnow.
ATTORNEYS.

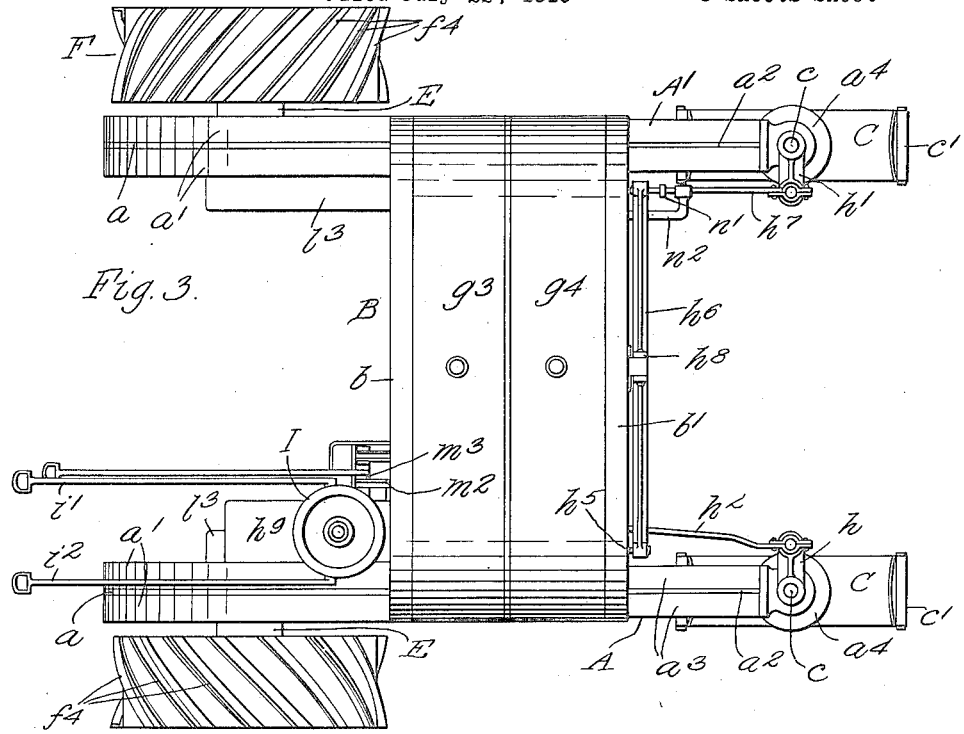

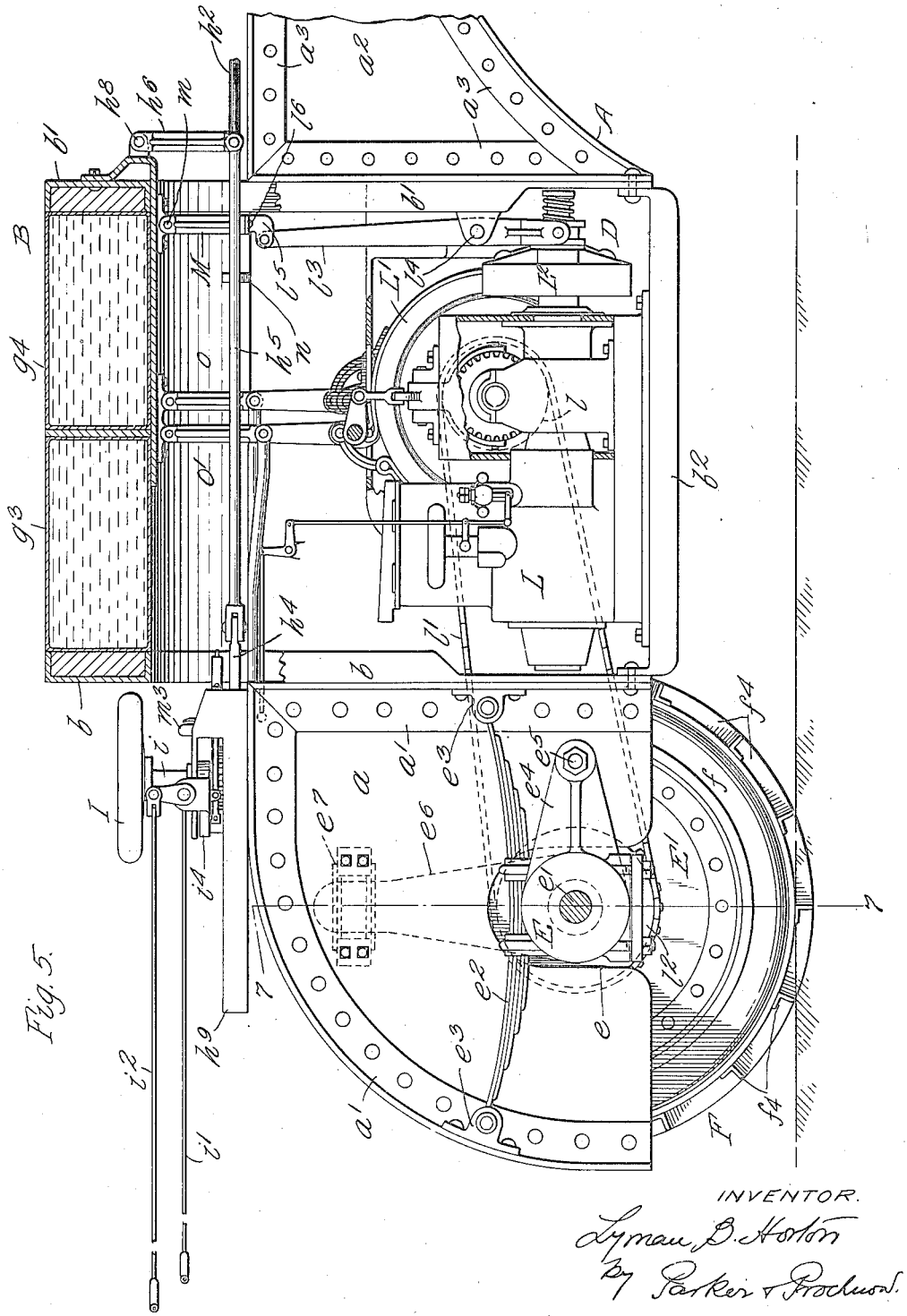

Aug. 7, 1923.

L. B. HORTON

TRACTOR OR THE LIKE

Filed July 22, 1919 5 Sheets-Sheet 4

1,463,817

INVENTOR.
Lyman B. Horton
by Parker & Prochnow.
ATTORNEYS.

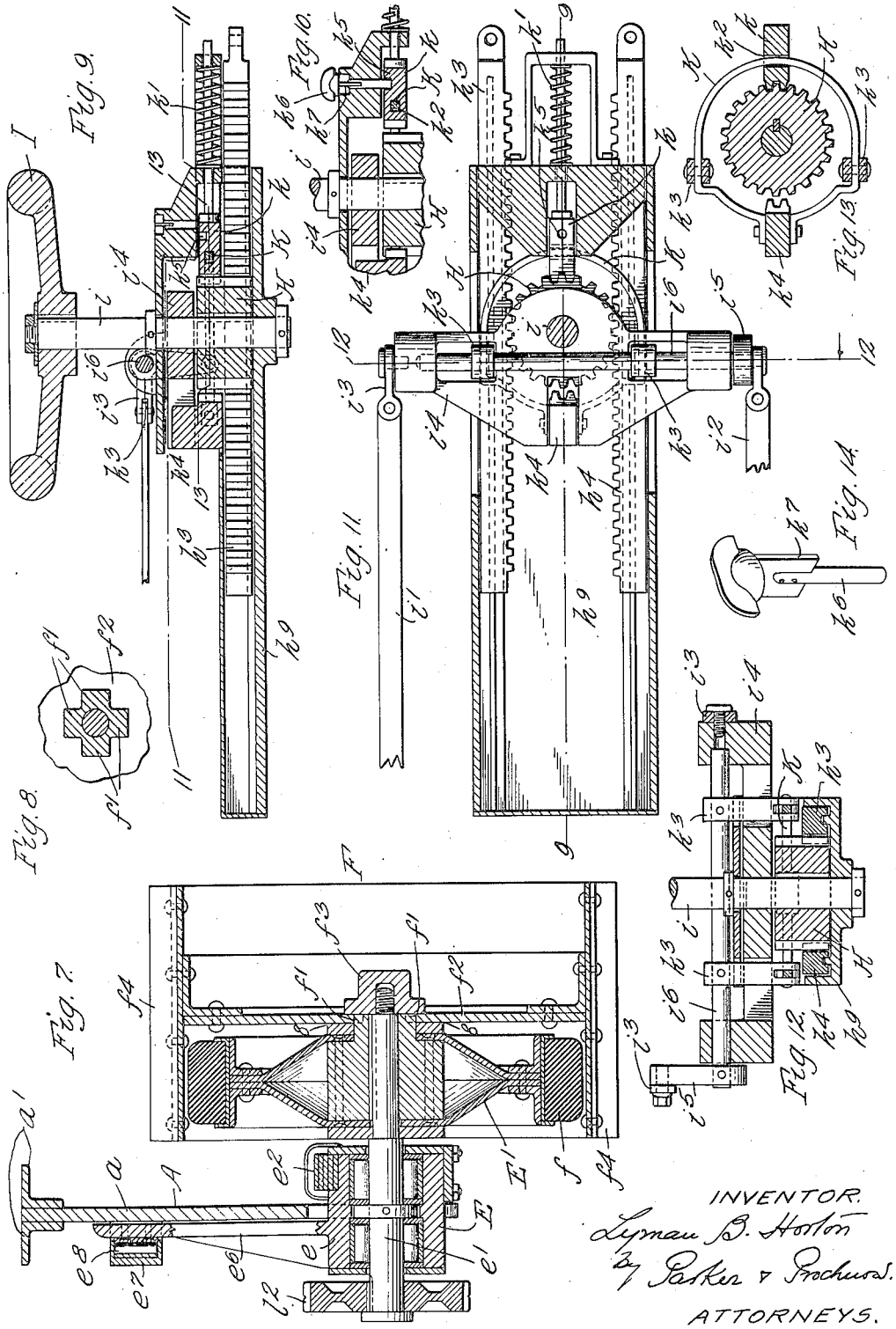

Patented Aug. 7, 1923.

1,463,817

UNITED STATES PATENT OFFICE.

LYMAN B. HORTON, OF OLEAN, NEW YORK.

TRACTOR OR THE LIKE.

Application filed July 22, 1919. Serial No. 312,534.

*To all whom it may concern:*

Be it known that I, LYMAN B. HORTON, a citizen of the United States, residing at Olean, in the county of Cattaraugus and State of New York, have invented a new and useful Improvement in Tractors or the like, of which the following is a specification.

This invention relates to tractors of the kind which can be used for general farm and road purposes.

The objects of this invention are to provide a tractor of this kind in which the frame is arched or bowed in such a manner that the middle portion of the frame is sufficiently high to permit the tractor to be used for cultivating or analogous purposes between rows of plants; also to provide, a tractor of this kind in which the frame is of rigid structure so that a single wheel cannot sink into a mud hole or soft place in a field or road; also to provide a device of this kind with separate means for propelling each of the driving wheels; also to provide a connection between the steering mechanism and the propelling means for throwing one or another of the propelling devices out of operation when the steering mechanism is placed into a position to make a short turn; also to provide a tractor which can be readily changed for use either in fields or on a road; also to improve devices of this kind in other respects hereinafter specified.

In the accompanying drawings:

Fig. 3 is a top plan view thereof.

Fig. 4 is a front elevation thereof.

Fig. 5 is a longitudinal sectional elevation thereof on an enlarged scale, the front portion of the tractor being omitted.

Fig. 7 is a fragmentary transverse sectional elevation thereof on line 7—7, Fig. 5.

Fig. 8 is a fragmentary detail view of a part of a demountable tractor wheel on line 8—8, Fig. 7.

Fig. 9 is a fragmentary longitudinal sectional elevation thereof on line 9—9, Fig. 11, showing the steering mechanism.

Fig. 10 is a fragmentary view similar to Fig. 9, showing the lock for the steering mechanism in an inoperative position.

Fig. 11 is a fragmentary sectional plan view thereof on line 11—11, Fig. 9.

Fig. 12 is a transverse sectional elevation thereof on line 12—12, Fig. 11.

Fig. 13 is a fragmentary sectional plan view thereof on line 13—13, Fig. 9.

Fig. 14 is a perspective view of a key or pin by means of which the lock for the steering mechanism may be rendered inoperative.

Figure 1:
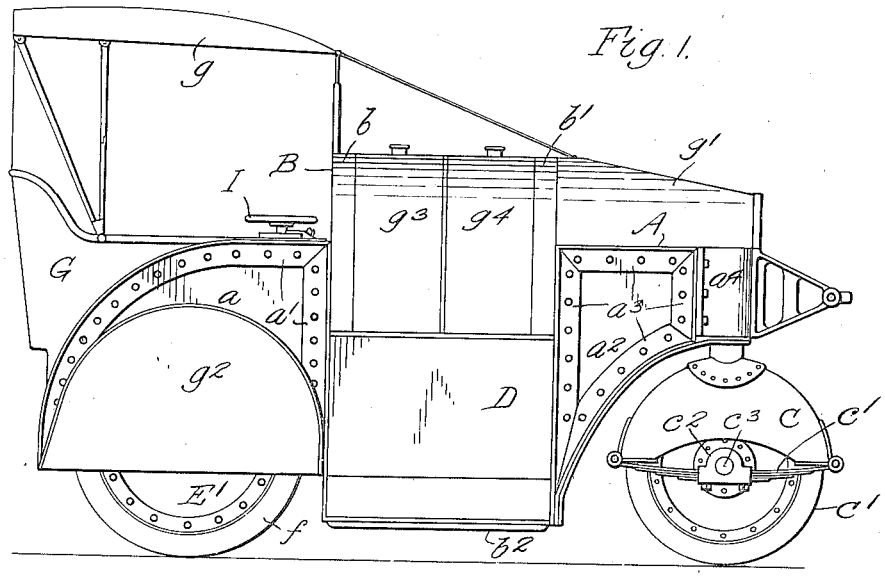
Fig. 1 is a side elevation of a tractor equipped for use on a road.
Figure 2:
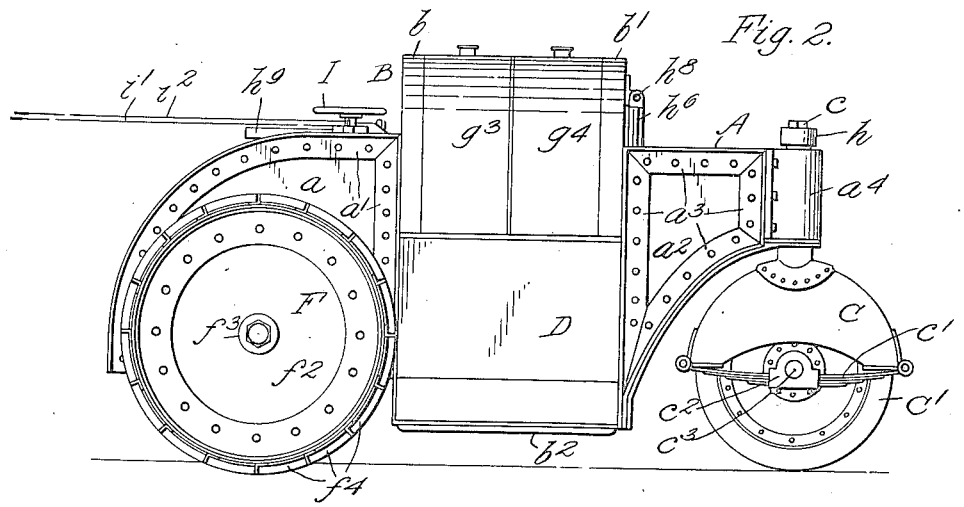
Fig. 2 is a similar view thereof showing the tractor adapted for use in a field.
Figure 6:
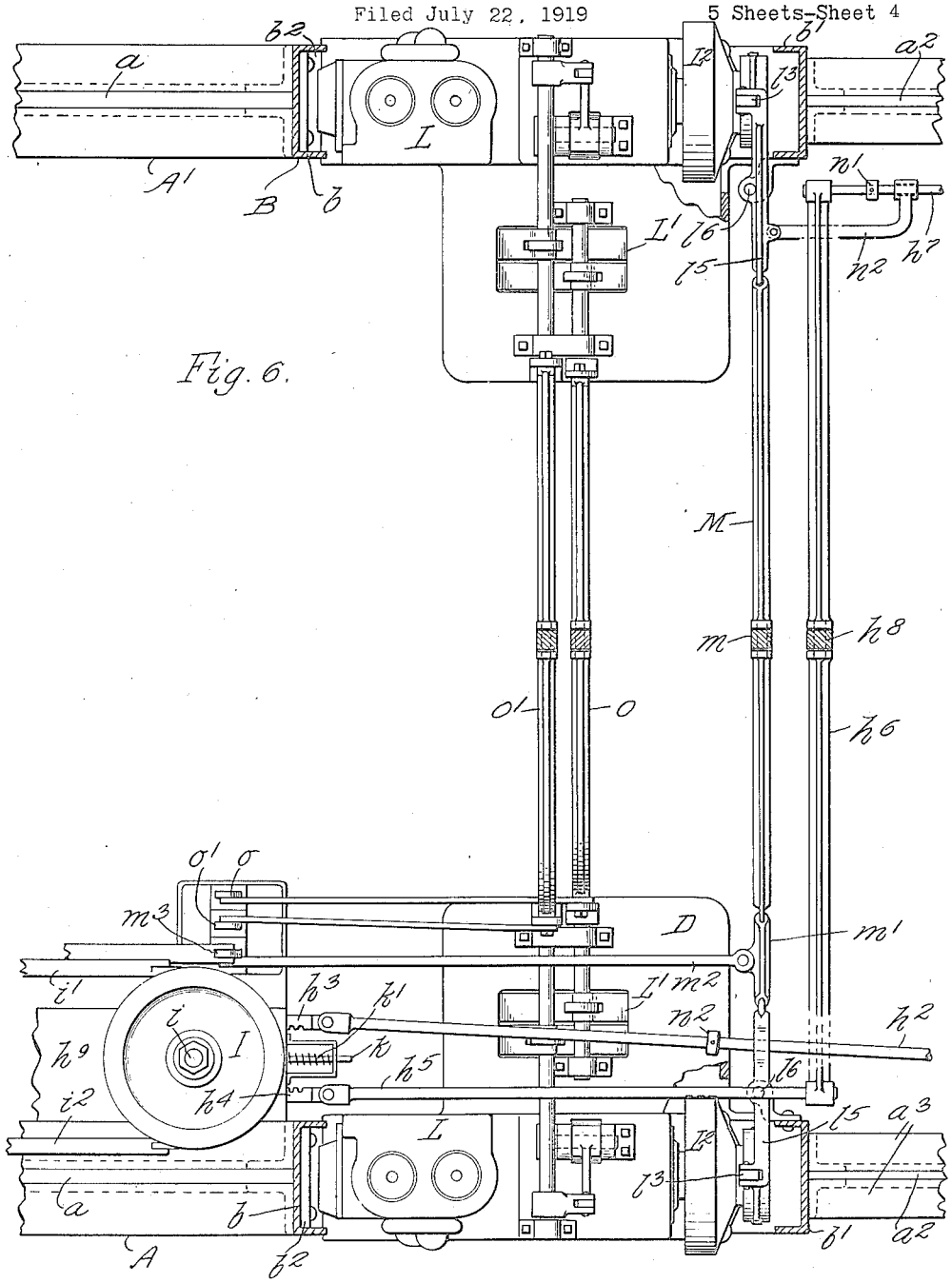
Fig. 6 is a top plan view, partly in section, of the middle portion of the tractor.

Briefly stated, the tractor frame shown in the drawings comprises two rigid sides on the front and rear portions of which the wheels are arranged. The sides are connected by an arch-shaped frame member, rigidly secured to the side portions of the tractor. Each of the two sides is provided between the front and rear wheels with an enlarged portion or compartment in which a power plant or driving mechanism is arranged, two substantially independent power plants being preferably employed in the tractor. The steering mechanism of the tractor is preferably so constructed that the tractor can be steered either from points in rear of the tractor by means of lines, or by means of a steering wheel or other device on the tractor, and means are provided whereby the steering gear when placed into a position to make a short turn, will disconnect one or another of the driving mechanisms from its corresponding driving wheel.

A and A' represent the two side frames of the tractor which are connected by means of an arch-shaped connecting member B. Each of the side members includes a rear frame member consisting of a plate $a$ having reinforcing angle-shaped members $a'$ secured to the upper, rear and front edges thereof, and the front section of each side frame comprises a plate $a^2$ having angle-irons $a^3$ secured around the edges thereof, the angle irons of the rear and front frame sections being preferably secured to both sides of the plates $a$ $a^2$. At the front portion of the front section a substantially vertical bearing $a^4$ is arranged in which an upright pivot or shaft $c$ of the front wheel frame C is arranged. This wheel frame preferably consists of a housing for the upper portion of the wheel C' which forms a mud guard therefor and to the lower edges of which the opposite ends of a spring $c'$ are secured. The spring $c'$ supports a bearing $c^2$ in which the axle $c^3$ of the wheel C' is journaled. The front wheels may be turned about the axis of the vertical pivots $c$ by means of a steering mechanism hereafter described, for directing the vehicle as may be desired. Side frames of other construction may be employed if desired.

The front and rear frame sections of each side frame are preferably connected by means of a housing D which, in the construction shown, is also made of steel plates, and in which an engine and other parts of the driving mechanism are arranged, an engine being preferably provided in each side frame of the tractor.

The transverse frame member B preferably includes two arch-shaped members $b$ $b'$ which are preferably of channel cross-section, the longest webs of the channels being arranged in a substantially vertical plane. The channels $b$ $b'$ are secured respectively to the angle irons $a'$ on the rear frame sections and $a^3$ of the front frame sections. The front and rear sections of each side member are also connected by a member $b^2$ which forms the base of the engine and other driving parts of the tractor.

The plates $a$ of the rear side sections are provided with recesses or slots $e$ extending upwardly from the lower edges of the plates, and each of these recesses contains a bearing E for a stud axle or shaft $e'$ to which a rear wheel E' is secured. The bearing E is supported from the side frame by means of a spring $e^2$, the opposite ends of which are secured to brackets $e^3$ mounted on the angle irons $a'$ of the rear side frame section. In order to securely hold the bearing E on the side frame and permit a limited movement thereof, due to the compression of the spring $e^2$, the following construction is preferably employed:

Each bearing E is provided with two arms, an arm $e^4$ which extends substantially in a horizontal direction and which is pivoted at its end to the rear frame section, as shown at $e^5$, in such a manner as to permit the bearing to swing upwardly and downwardly about the pivot $e^5$. The other arm $e^6$, see Figs 5 and 7, extends substantially upright and is secured at its ends to the plate $a$ in such a manner as to permit this arm to move sidewise and lengthwise with regard to the plate, so as to permit the bearing to move relatively to the frame in accordance with the deflections of the spring $e^2$. The two arms $e^4$ and $e^6$ are preferably arranged at opposite sides of the plate $a$ and by having their ends secured to the plate $a$ a rigid and strong construction is ensured. In order to hold the upper end of the arm $e^6$ in place with reference to the plate $a$ and to permit the arm to move in a substantially vertical plane, parallel to the plane of the plate $a$, a substantially U-shaped holding or bearing member $e^7$ is employed the ends of which are secured to the plate $a$, and which is preferably provided with roller bearings $e^8$ which facilitate the movement of the upright arm $e^6$ relatively to the plate $a$. The bearing E may be of any suitable construction, roller bearings being preferably provided to reduce the friction of the stud axle $e'$. These roller bearings may be of any suitable or desired construction.

Each driving wheel E is preferably provided with a rubber tire $f$ which is used when the vehicle is operating on a road, and it is desirable to provide a tractor wheel F which may be applied to the wheel E' without removing the latter from the stud axle. In the construction shown for this purpose, the hub of the wheel E' is provided with driving projections $f'$, see Fig. 8, which are adapted to engage with the disk $f^2$ of the tractor wheel F, the hub cap or nut $f^3$ which holds the wheel E' on the stud axle $e'$ being preferably also used for holding the tractor wheel F on the hub of the road wheel E'. The tractor wheel is provided with a wide tread and is preferably provided with cleats or tread members $f^4$. When it is desired to apply the tractor wheel to the device it is only necessary to elevate the rear portion of each side frame and to remove the nut $f^3$, to place the tractor wheel in position and then again to secure the nut in place. Wheels of any other construction may be used if desired.

The tractor may be used either for plowing or other farm purposes or, if desired, the tractor may be used on a road. When used for road purposes, a body G having a top $g$ is preferably secured to the opposite side frames in any suitable manner and a seat can be arranged in the body G between the two side frames. A hood $g'$ may be used to improve the appearance of the vehicle and a mud-guard $g^2$ may also be suitably applied to extend over each of the wheels E'. The space between the two connecting frame members $b$ and $b'$ is preferably occupied by tanks $g^3$ $g^4$, which may be used for fuel and for water for cooling the engines. When the tractor is to be used for plowing or cultivating or analogous purposes, the body, top, mud-guard and hood shown in Fig. 1, are removed. The tractor then can be used for cultivating or analogous purposes between rows of grain or other produce which has grown to a considerable height, since the arched construction of the connecting frame or member B permits the tractor to straddle a row or rows of plants, the front and rear wheels tracking in the space between the rows.

The upright pivots $c$ of the front wheels are provided with steering knuckles or arms $h$ $h'$ which extend inwardly with regard to the tractor. The steering knuckle $h$ is connected by means of a link $h^2$ to a rack bar $h^3$ which is moved to effect the steering of the vehicle by means of a steering gear H meshing with the rack bar $h^3$ of the steering arm $h$ and with a rack bar $h^4$ connected by means of a link $h^5$ to a curved or arch-shaped lever $h^6$, the other end of which is connected by means of a link $h^7$ to the steering knuckle or arm $h'$. The lever $h^6$ is pivoted at $h^8$ to swing about a substantially horizontal pivot so that when the rack bar $h^4$ is actuated to cause the link $h^5$ to push the lower end of the lever $h^6$ outwardly, the other lower end of the lever to which the link $h^7$ is connected will also be moved outwardly and turn the steering knuckle $h'$ connected therewith. In this manner the turning of the steering gear in one direction or another causes the two front wheels to be simultaneously moved in the same direction. The rack bars $h^3$ $h^4$ are suitably guided in a housing $h^9$.

The actuation of the steering mechanism may be effected either by means of a steering wheel I secured on a steering shaft $i$ to which the steering gear H is also secured, or by means of lines or cords, connected by suitable devices to the steering gear H. The steering wheel I is preferably used when the tractor is used on a road. When the tractor is used for field work, it is desirable to provide means whereby the tractor can be steered by an operator riding on the plow, cultivator, or other device drawn by the tractor. This is effected by means of two lines or cords $i'$ $i^2$ which may be used by the operator in a manner similar to the use of lines for driving a horse. The lines are provided at their ends with connections $i^3$, one of which is connected to one end of a steering yoke or member $i^4$ which is loosely pivoted on the steering shaft $i$ so as to swing freely about the shaft. The other connection $i^3$ is pivotally arranged on the end of a crank arm $i^5$ secured to a rock shaft $i^6$ which is journaled in the steering yoke $i^4$. When the steering lines $i'$ $i^2$ are slack, means are preferably provided for holding the steering mechanism in the position in which it is set, so that it is only necessary to actuate the lines when it is desired to change the direction of movement of the tractor. For this purpose a locking dog or latch $k$ is provided which is slidably mounted in a part of the guide housing $h^9$ of the steering mechanism, and which is yieldingly held by means of a spring $k'$ in locking engagement with the gear H. This locking dog may be thrown out of its locking position by means of a ring-shaped member K which extends through a hole or slot $k^2$ in the locking dog $k$. The ring member K is connected with the rock shaft $i^6$ by means of arms $k^3$ which are rigidly secured to the shaft $i^6$ and are pivotally connected with the ring member K. If, therefore, the right-hand line be given a slight pull, the shaft $i^6$ will be turned through a part of a revolution in such a manner that the arms $k^3$ will move the ring member K forwardly, moving the locking dog $k$ out of engagement with the gear H and moving a dog or toothed member $k^4$ which is secured to the ring member K into engagement with the gear H. The yoke $i^4$ and the shaft $i^6$ connected therewith may then be turned in either direction by pulling on one or the other of the two steering lines, the yoke member $i^4$ turning about the axis of the shaft $i$ and carrying with it the ring-member $k$ which in turn moves the steering gear in either direction by means of the dog $k^4$. As soon as the tension on the lines is released, the spring $k'$ will push the locking dog back into its locking position and will also push the ring member K back into a position to move the steering dog or tooth $k^4$ out of engagement with the gear H. Any other means for steering the tractor may be used.

When it is desired to use the tractor without the line driving mechanism, the locking dog $k$ can be held out of its locking position. This is done in the construction shown by providing a hole $k^5$ in the locking dog $k$, and arranging a pin $k^6$ in the guide housing $h^9$ in such a manner that the pin may enter into the hole $k^5$ of the locking dog when the same is in its unlocked position, to hold the dog in this position. The steering wheel I may then be used to steer the tractor. The pin $k^6$ is preferably provided with outwardly extending portions $k^7$ which may engage a part of the guide housing $h^9$ when the pin is turned to hold the same out of its locked engagement with the locking dog when it is desired to use the line steering mechanism.

Steering devices of any other suitable kind or construction may be employed.

The housings D of the sides of the tractor each contain a suitable source of power, such as an internal combustion engine L, a change speed gear mechanism L', and a clutch $L^2$, all of which parts may be of any suitable or desired construction. Power is transmitted from the engine to the rear wheel in any suitable manner, for example, by means of a sprocket wheel $l$ connected by means of a chain $l'$ to a sprocket wheel $l^2$ rigidly secured on the rear axle. The sprocket chains $l'$, sprocket wheels $l^2$ and adjacent parts are preferably enclosed in substantially dust proof housings $l^n$, Fig. 3, which are secured to the side frames and which prevent injury to the moving parts due to dirt, dust and other foreign matter. The clutches $L^2$ which control the transmission of power from the engines L to the rear wheels are, in the construction shown, actuated by means of levers $l^3$ pivoted at $l^4$ to the frame of the tractor. These levers are connected at their upper ends to horizontally arranged levers $l^5$ pivoted at $l^6$ on the frame of the tractor. One of these levers is connected directly to an arch-shaped lever M which is pivoted at $m$ to swing about a horizontal axis in such a manner that the two lower ends of the arch-shaped lever will swing forwardly or rearwardly together. At the side of the frame on which the steering wheel is arranged, the end of the lever M is connected to a link $m'$ to which a rod $m^2$ is pivotally secured, the rod $m^2$ being connected to a clutch-actuating lever $m^3$. When the lever $m^3$ is actuated to push the rod $m^2$ forwardly, the connecting link $m'$ moves the end of the lever $l^5$ connected therewith and the lower end of the arch-shaped lever M forwardly, causing the opposite end of the lever M to move forwardly to move the corresponding end of the lever $l^5$ connected therewith forwardly. The two levers $l^5$ actuate the levers $l^3$ to actuate the clutches. Clutch actuating means of any other suitable construction may be employed, if desired.

Means are preferably provided whereby one or another of the clutches is disengaged when the steering mechanism is turned to make a short turn. In the construction shown for this purpose, the rod $h^2$ which extends to the steering knuckle on the front wheel of the right-hand frame member, is provided with a collar or projection $n$ which is adapted to strike the lever $l^5$ to actuate the clutch on the right-hand side of the tractor to disengage the same when the tractor is making a short turn to the right. When the steering mechanism is actuated to make a corresponding turn to the left, the clutch on the left-hand side of the tractor is disengaged by means of a collar or projection $n'$ arranged on the steering rod $h^7$ and adapted to engage an arm $n^2$ pivotally connected to the link $l^5$ on the left-hand side of the tractor. When the projection $n'$ engages the arm $n^2$ to move the same forwardly, the clutch on the left-hand side of the tractor will be rendered inoperative without interfering with the operation of the clutch on the right-hand side of the tractor, so that a short turn to the left can be effected.

In order to enable the change speed mechanism on the two sides of the tractor to be simultaneously actuated, curved or arched-shaped levers O and O' are provided which operate in a manner similar to the levers M and $h^6$ and which are actuated by means of levers $o$ and $o'$ respectively. The arch-shaped structure of these levers conforms substantially with the shape of the connecting portion B of the tractor and makes it possible to use the tractor between rows of plants. When the body G is secured to the tractor, the space between the side frames affords ample room for the feet of the occupants.

The tractor described is very desirable for work on uneven ground since the rigid frame construction makes it impossible for one wheel to sink into a mud hole or soft place. If one wheel enters into a soft spot in a field, the other wheels remaining on hard ground will carry an increased weight, thus in many cases preventing the stalling of the tractor. The arrangement of the two engines as described has the advantage of eliminating the differential gears commonly used, which have many objectionable features, and of enabling the tractor to be used even if one of the engines becomes stalled. The arched connecting member adds greatly to the usefulness of this machine since it can be used between rows of plants without injuring the same. The use of the line steering mechanism described enables an operator to have perfect control of the tractor without riding on the same, so that one man can do the same work with this tractor that would require two men in tractors of other kinds. After the tractor is started in the right direction, the releasing of the lines will cause the steering mechanism to be locked so that the operator can devote his entire attention to the apparatus drawn by the tractor.

I claim as my invention:

1. In a tractor, the combination of rigid side frames, front and rear wheels mounted on said rigid side frames, and an arch-shaped connecting member having its lower portions connected to said side frames and having a raised intermediate portion leaving a relatively high clear space intermediate of said side frames.

2. In a tractor, the combination of rigid side frames, front and rear wheels mounted on said rigid side frames, and a rigid arch-shaped connecting member having its lower portions rigidly connected to said side frames and having an upwardly extending intermediate portion.

3. In a tractor, the combination of a pair of side frames, comprising front and rear portions and an intermediate portion, said portions being rigidly connected, an independent source of power on each of said side frames, a ground wheel on each side frame driven from said source of power, and means for rigidly connecting said side frames.

4. In a tractor, the combination of a pair of rigid side frames, an independent source of power front and rear wheel supports for each of said side frames and rigidly connected with said housings, in each of said side frames, a housing in each of said side frames for said source of power, and means for rigidly connecting said side frames.

5. In a tractor, the combination of a pair of rigid side frames, comprising front and rear portions and an intermediate portion, said portions being rigidly connected, a source of power arranged in said intermediate portions, and a connecting member secured to said two side frames.

6. In a tractor, the combination of a pair of rigid side frames having front and rear portions each comprising a substantially vertical plate and flanged members on said plate, intermediate frame portions to which said front and rear portions are secured and which form housings, a source of power in each of said housings, and means connecting said frame members.

7. In a tractor, the combination of a pair of rigid side frames having front and rear portions each comprising a substantially vertical plate and flanged members on said plate intermediate frame portions to which said front and rear portions are secured and which form housings, a source of power in each of said housings, and a pair of arch-shaped connecting members of substantially channel-shaped cross-section and having their ends connected to said flanged members at the ends of said housings.

8. In a tractor, the combination of side frames having wheels and a substantially arch-shaped connecting member secured at its ends to said side frames, a steering mechanism arranged on one of said side frames and connected with one of the wheels of said side frame, a lever curved to conform with the shape of said connecting member and pivoted intermediate of its ends on said connecting member, and connections between said steering mechanism and said lever and between said lever and one of the wheels of said other frame.

9. In a tractor, the combination of side frames having wheels, and a substantially arch-shaped connecting member secured at its ends to said side frames, a source of power in each of said side frames, clutches for connecting said sources of power to said wheels, controlling devices for said tractor arranged on one of said side frames and including a steering mechanism and means for actuating said clutches, and curved levers conforming substantially to the shape of said connecting member which transmit motion from said steering mechanism and from said clutch-actuating mechanism from one side frame to the other.

10. In a tractor, the combination of a pair of rigid side frames, each having a rear portion including a substantially vertical plate, a slot extending upwardly into said plate from the lower edge thereof, a wheel, a stud axle on which said wheel is secured, a bearing for said axle pivotally connected with said plate and extending into said slot, and a spring connecting said bearing and said frame.

11. In a tractor, the combination of a pair of rigid side frames each having a rear portion including a substantially vertical plate, a slot extending upwardly into said plate from the lower edge thereof, a wheel, a stud axle on which said wheel is secured, a bearing for said axle, an arm secured to said bearing and extending substantially parallel to said plate and pivotally secured thereto, and a spring secured to said side frame and said bearing.

12. In a tractor, the combination of a pair of rigid side frames each having a rear portion including a substantially vertical plate, a slot extending upwardly into said plate from the lower edge thereof, a wheel, a stud axle on which said wheel is secured, a bearing for said axle extending into said slot, arms rigidly secured to said bearing and extending to the opposite sides of said plate, one of said arms being pivotally secured to said plate and the other arm being movable relative to said plate, whereby the arms hold the bearing against lateral movement relatively to the side frame.

13. In a tractor, the combination of a pair of rigid side frames each having a rear portion including a substantially vertical plate, a slot extending upwardly into said plate from the lower edge thereof, a wheel, a stud axle on which said wheel is secured, a bearing for said axle extending into said slot, arms rigidly secured to said bearing and extending to the opposite sides of said plate and arranged at an angle to each other, a pivotal connection between one of said arms and said plate permitting said bearing to move vertically relative to said plate, and means for preventing said other arm from moving in a direction away from said plate and a spring connecting said bearing and said frame.

14. In a power propelled vehicle the combination of side frames, each having a rear portion including a substantially vertical plate, a substantially upright slot in said plate, a wheel, a stud axle on which said wheel is secured, a bearing for said axle pivotally connected with said vehicle and extending into said slot and movable therein while swinging about the pivot of said bearing, and a spring connecting said bearing and said frame.

15. In a power propelled vehicle, the combination of a frame having substantially upright members at opposite sides provided with substantially upright guide slots, an axle extending through each slot, bearings for said axle also arranged in said slots, arms secured on said bearings and extending substantially at right angles to said slots and pivoted at one end so as to permit said bearings to move lengthwise of said slots, and springs connecting said bearings and said frame.

16. In a tractor, the combination of rigid side frames, wheels supporting said side frames, an arch-shaped connecting member having its lower portions connected to said side frames and having a raised intermediate portion, means on one of said side frames for controlling the speed and operation of said tractor, a steering mechanism adapted to be actuated from the same side of the tractor, and a series of arch-shaped levers conforming substantially in shape to said connecting member and pivoted thereon, said levers transmitting movements of said steering mechanism and said controlling mechanisms from one side frame of the tractor to the other side frame.

17. In a tractor, the combination of rigid side frames, wheels supporting said side frames, an arch-shaped connecting member having its lower portions connected to said side frames and having a raised intermediate portion, means on one of said side frames for controlling the speed and operation of said tractor, a steering mechanism adapted to be actuated from the same side of the tractor, and a series of arch-shaped levers conforming substantially in shape to said connecting member and pivoted thereon to swing about a substantially horizontal axis so that the lower end of said levers connect with the steering and controlling devices at one side of the tractor and transmit the motion of said devices to the other side of the tractor.

18. In a tractor, the combination of rigid side frames, wheels supporting said side frames, an arch-shaped connecting member having its lower portions connected to said side frames, and a body detachably secured to said side frames and extending between said side frames.

19. In a tractor, the combination of rigid side frames, wheels supporting said side frames, an arch-shaped connecting member having its lower portions connected to said side frames and having a raised intermediate portion, said connecting member including two arch-shaped steel members arranged with their longest web in a substantially upright plane and spaced apart, and tanks conforming substantially in curvature to said connecting member and arranged between said steel members.

20. In a tractor, the combination of rigid side frames, wheels supporting said side frames and a connecting member rigidly secured to said side frames and including two arch-shaped channel members secured at their lower ends to said side frames and arranged with their largest web in a substantially upright plane, a water tank and a fuel tank conforming substantially to the curvature of said connecting member and arranged in the space between said two channel members.

21. In a tractor, the combination of two rigid side frames, and a connecting member secured to said side frames, a driving wheel and a steering wheel for each of said side frames, said steering wheel being arranged in a frame having a substantially vertical pivot, a bearing in said side frame in which said pivot is journaled, and steering mechanism connecting with said pivot.

22. In a tractor, the combination of two rigid side frames and a connecting member secured to said side frames, a driving wheel and a steering wheel for each of said side frames, said steering wheel being arranged in a frame having a substantially vertical pivot, a housing for said wheel arranged at the lower end of said pivot and forming a mud-guard, a spring connecting said housing and said wheel, and a bearing in the side in which said vertical pivot is journaled.

Witness my hand, this 21st day of June, 1919.

LYMAN B. HORTON.

Witnesses:
ROGER R. WARNER,
ETHAN W. JUDD.